United States Patent Office 3,844,999
Patented Oct. 29, 1974

3,844,999
FLUOROACRYLATE COATING COMPOSITIONS
Robert G. Petrella, Glenolden, Pa., assignor to Air Products and Chemicals, Inc., Allentown, Pa.
No Drawing. Continuation-in-part of abandoned application Ser. No. 70,472, Sept. 8, 1970. This application Apr. 6, 1972, Ser. No. 241,844
Int. Cl. C08f 45/24; C09d 5/02
U.S. Cl. 260—29.6 F
16 Claims

ABSTRACT OF THE DISCLOSURE

Fluoroacrylate copolymers are prepared by copolymerization of a methylolated diacetone acrylamide monomer and a fluoroacrylate monomer having the structure: $R_fCH_2OCOC(R)=CH_2$, where R is H or $CH_3$ and $R_f$ is:
$C_nF_{2n-1}$, where $n$ is 6 to 16;
$HC_nF_{2n}$, where $n$ is 2 to 12; and
$C_nF_{2n+1}(CH_2)_x$, where $n$ is 3 to 12 and $x$ is 0 or 1.
Improved stain and soil resistance in paint film are obtained by incorporating the fluoroacrylate copolymers in paint compositions in an amount between 0.05 and 0.7 percent solids, based on the total paint solids. Compositions containing the fluoroacrylate copolymers can be distinguished by their ability to provide films which are curable at room temperature.

CROSS REFERENCE TO RELATED APPLICATION

This application is a continuation-in-part of application Ser. No. 70,472 filed on Sept. 8, 1970, now abandoned.

BACKGROUND OF THE INVENTION

The present invention relates to fluoroacrylate copolymers compositions and more particularly, to copolymers prepared by polymerizing a fluoroacrylate monomer with a methylolated amide-containing acrylic or methacrylic comonomer and to paint compositions containing said fluoroacrylate copolymers. When applied to a surface, said paint compositions provide properties which pervent or reduce soil accumulation on the surface of the paint film.

Solid accumulation and staining on the surface of paint film is a significant problem, especially when the surface of the film becomes heated and the film is softened. It has been found that latex paint coatings in particular show a tendency to retain stains and dirt, thereby causing the coatings to become less attractive and more difficult to clean. It has been observed, for example, heat from the sun can soften the film surface of latex paint and, when this occurs, windborne soil tends to stick to the surface of the softened film. Also, the film surface tends to respond unfavorably when exposed to dirt and soil having certain solvent properties. Such soil detracts from both the service life of the film and its aesthetic appearance.

One approach to correcting the problem of soil accumulation on thermally softened paint film involves the incorporation of a hard thermoplastic emulsion polymer into the paint to reduce the thermal softening properties of the finished film. However, inclusion of such thermoplastic polymers into paint, though rendering it less susceptible to thermal softening, and therefore, less susceptible to soiling and dirt retention while thermally softened, does not improve its resistance to solvent-type soil and dirt accumulation and retention.

Other attempted solutions to the problem of soil accumulation on thermally softened paint film have involved the use of formulations which provide self-powdering surfaces and the use of subsequent applications of clear lacquers and/or glazes to the film. The present invention obviates the necessity for such prior art practices.

Because of certain properties of fluorine containing polymers another approach concerns the use of copolymer compositions, such as those described in U.S. Pat. 3,378,609 to Fasick et al. This patent suggests copolymerizing a fluorinated monomer with a non-fluorinated monomer. The latter typically may be N-methylol acrylamide or N-methylol methacrylamine, which in turn is copolymerized with any of several linear structural fluorine containing monomers disclosed therein. Although these compositions provide a measure of improvement over other techniques used heretofore, they are also less than satisfactory. In this regard, such copolymers, when added to paint compositions, result is providing paint films possessing greater resistance to soiling. However, such films containing copolymerized compounds, like N-methylol acrylamide or N-methylol methacrylamide do not harden sufficient upon drying at room temperature to form hard, cured, non-softenable surfaces, and as a result, the film properties for preventing soil accumulation are not entirely satisfactory.

Surprisingly, it has been discovered that the copolymer and paint compositions of the present invention, prepared by copolymerizing either linear or cyclic structured fluoroacrylate monomers with amide-containing acrylic monomers selected from the group consisting of methylolated diacetone acrylamide and methylolated diacetone methacrylamide, may be cured by cross-linking at ambient temperature to form paint films having hard surfaces or finishes. Accordingly, paint films containing these fluoroacrylate compositions do not soften when exposed to thermal radiation, such as from the sun, and therefore, windborne soil does not adhere to such paint film surfaces. Furthermore, because the foregoing compositions provide hard, non-softenable films, additional benefits are derived such as superior barrier properties offering greater protection to substrates from weather and decay.

Accordingly, it is a principal object of the present invention to provide an improved fluoroacrylate copolymer composition.

Another object of the present invention is to prepare fluoroacrylate copolymers by copolymerizing a fluoroacrylate monomer with a methylolated diacetone acryl amide or methacrylamide comonomer.

Still another object of the present invention is to provide a paint composition which is curable at room temperature and non-softenable at elevated temperatures thereby providing improved resistance to accumulation and retention of soil and dirt.

These and other objects, features and advantages will become apparent to those skilled in the art after a reading of the following, more detailed description.

PREFERRED EMBODIMENTS OF THE INVENTION

The invention is directed to the preparation of a fluoroacrylate copolymer comprising a fluoroacrylate monomer having the structure:

$R_fCH_2OCOC(R)=CH_2$, where R is H or $CH_3$ and $R_f$ is:
$C_nF_{2n-1}$, where $n$ is 6 to 16;
$HC_nF_{2n}$, where $n$ is 2 to 12; and
$C_nF_{2n+1}(CH_2)_x$, where $n$ is 3 to 12 and $x$ is 0 or 1, and a methylolated diacetone acrylamide or methacrylamide comonomer selected from the group consisting of methylolated diacetone acrylamide and methylolated diacetone methacrylamide. Because of the ability of the fluoroacrylate copolymers to cure at room temperature without the application of heat above average environment temperatures, their addition to paints alters the surface of resulting paint films such that the films have improved resistance to thermal softening, reduced surface-free energy and improved resistance to sail pickup or accumulation. The desirable properties of the compositions of the present invention are accomplished by incorporation of the fluoroacrylate copolymers in paint compositions in an amount from about 0.05 to about 0.7 percent solids, based on total paint solids.

Specific examples of the fluoroacrylate monomers which may be used in the present invention include:

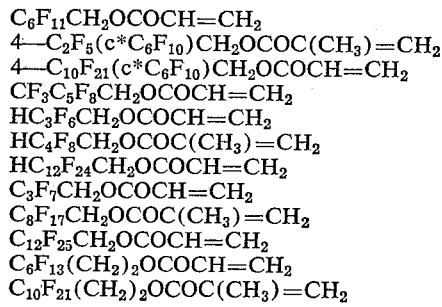

*C=cyclic.

The fluoroacrylate monomers of the present invention are known compounds to persons of ordinary skill in the art and are well documented in the literature. For example, copending patent application Ser. No. 608,510 filed on Jan. 11, 1967 and now U.S. Pat. 3,600,433 illustrates perfluorocyclohexane esters of acrylic and methacrylic acids. Other patents, such as U.S. 3,304,278 teach the preparation of pentafluoroethyl carbinol acrylate and U.S. 2,642,416 shows methods of making pentadecafluoro (n-heptyl) carbinol acrylate. Omega-hydroperfluoro monomers are prepared according to methods shown in U.S. 2,559,629 and transesterified with methyl methacrylate as described in *Acrylic Resins*, by M. B. Horn, page 18, Reinhold Publishing Co.

The methylolated diacetone acrylamide or methacrylamide comonomer may be illustrated by the formula:

(A)

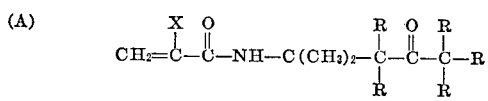

wherein X is H or $CH_3$ and R is H or $-CH_2OH$ in which an average of three R's are $-CH_2OH$ groups and the remaining R's are H. The hydroxymethyl groups as shown above are attached to the carbon atoms alpha to the keto carbonyl and are capable of self-crosslinking at normal environmental temperatures without the aid of either heat or catalyst.

Although, in most instances, methylolated diacetone acrylamide or methacrylamide will be used as a mixture of monomers having on the average about three methylol groups, the present invention also contemplates the use of homogeneous mixtures where each molecule will have the same number of methylol groups as the other molecules in the reaction mixture. That is to say, the fluoroacrylate monomer may also be copolymerized with a diacetone acrylamide or methacrylamide monomer in which, for example, only one hydrogen has been methylolated. This includes monomers in which up to all five hydrogens subject to methylolation have been methylolated. Accordingly, the present invention encompasses (1) homogeneous mixtures of diacetone acrylamide or methacylamide monomers in which from 1 to 5 of the hydrogen atoms alpha to the keto carbonyl are methylolated or more preferably (2) heterogeneous mixtures of such monomers in which on the average three hydrogens have been methylolated. Such products may be prepared by methylolating diacetone acrylamide or methacrylamide with about 0.5 to about 10 moles of formaldehyde per mole of diacetone acrylamide or methacrylamide.

The term copolymer, while usually encompassing two monomers, in this instance also contemplates the inclusion of a third monomer of the non-fluorinated ethylenically unsaturated type.

The copolymers described above may be produced in accordance with methods known in the art, such as by solution polymerization and emulsion polymerization techniques. Where solution polymerization techniques are employed, the combined monomers are dissolved in a solvent at a concentration of about 15 to about 70 percent by weight. A copolymerization temperature of between 25° C. and about 150° C. may be employed, the preferred range being about 60° C. and about 120° C. Suitable catalysts such as the various peroxide and azo-type catalysts may be employed as copolymerization initiators at a concentration of from about 0.1 to about 4 percent by weight of the reaction mixture.

Emulsion polymerization is carried out in a manner such that the monomers to be copolymerized are emulsified in a water solution containing a suitable surface active agent to obtain a resulting emulsion concentration of from about 5 percent to about 50 percent solids on the total weight of the emulsion. Usually, the temperature is raised between 30° C. and 90° C. to effect copolymerization in the presence of added catalysts selected from various peroxide, persulfate or azo-type catalyst. The concentration of the catalyst for copolymerization is normally between 0.01 percent and 2 percent, based on the weight of the monomers. Anionic or non-ionic emulsifying agents can be employed as surface-active agents to stabilize the emulsion during its makeup and copolymerization. Anionic and non-ionic agents may be combined to provide improved stabilization.

The resulting fluoroacrylate copolymer contain a ratio of fluoroacrylate monomer to methylolated diacetone acrylamide or methacrylamide comonomer in the range of from about 60:40 to about 99:1 and preferably from about 80:20 to about 90:10.

The following table illustrates but a few of the monomeric combinations used in preparing the copolymer compositions of the present invention:

TABLE I

| Fluoroacrylate monomer | Metholated diacetone monomer (Formula A) |
|---|---|
| $C_6F_{11}CH_2O_2CCH=CH_2$ | $X=H$, $R=(-CH_2OH)_{3 average}$ |
| $C_{12}F_{25}CH_2O_2CCH=CH_2$ | $X=CH_3$, $R=(-CH_2OH)_4$ |
| $4-C_2F_5(C_6F_{10})CH_2O_2CC(CH)_3=CH_2$ | $X=H$, $R=(-CH_2OH)_{3 average}$ |
| $HC_4F_8CH_2O_2CC(CH_3)=CH_2$ | $X=H$, $R=(-CH_2OH)_2$ |
| $C_3F_7CH_2O_2CCH=CH_2$ | $X=CH_3$, $R=(-CH_2OH)_5$ |

The paint in which the fluoroacrylate copolymers described herein can be used is not critical. For purposes of the present invention—paint—connotes any composition comprising a pigment suspended in a suitable liquid vehicle. The pigment portion of the paint may consist of virtually any type which provides opacity, color and added durability to the final product. However, because the fluoroacrylate copolymers are the aqueous emulsion type it has been found they are most readily adaptable to paint systems having aqueous dispersion vehicles, and more preferably, aqueous emulsion paint systems. This, of course, does not preclude their use in those paint systems having organic solvents, so long as such solvents are generally miscible with water. Thus, the fluoroacrylate copolymers are most acceptable for use in paint compositions having aqueous based systems where the vehicle includes a preponderance of water and/or water miscible organic solvents.

Particularly suitable examples of aqueous emulsion paint systems are those having natural and synthetic resins such as those customarily employed in latex paint compositions. Latex compositions include both interior and exterior paints providing flat, semi-gloss and gloss finishes, which find application on substrates such as wood, metal, concrete, plastics and the like.

Such paints include those commonly known to or identifiable by the trade as containing vehicles such as 100 percent acrylic, 100 percent vinylacetate polymer, vinyl chlorideacrylic copolymers, vinylacetate acrylic copolymers, ethylenevinyl acetate copolymers, styrene-butadiene copolymers, vinylacetate dibutyl maleate copolymers and the like. Such paint vehicles are generally supplied as aqueous emulsions.

The aforementioned paint compositions are prepared by methods known in the art. For example, interior flat paint is prepared by (a) mixing together measured amounts of water, dispersing agent, thickening agent and wetting agent, and (b) mixing the resulting admixture together with an appropriate mixture containing anti-foam agent, coalescent agent, wetting agent and a bacteriostat mildewcide. Generally, the latter mixture is slowly added to the former. A blend containing a primary pigment (e.g., $TiO_2$, clay extender and a flatting agent such as $SiO_2$) is typically added to the admixture of (a) and (b). The resulting mixture is then subjected to high shear mixing for about 15 minutes and subsequently to a lower mixing speed during which time additional amounts of thickener and anti-foam agent are added. An appropriate vehicle is also normally added during the period of low speed mixing. Additional water may be added if needed and, where pH control is necessary, such control can be achieved by the addition of, for example, an appropriate base, such as ammonia.

The fluoroacrylate copolymers of the present invention may be added to the latex paint mixture during any stage of the formulation. Preferably, the addition is made during or as the final step in the preparation of the latex paint. It has been found that desirable paint compositions are obtained when the fluoroacrylate copolymers of the invention are present in amount of from 0.05 to 0.7 percent solids, based on the total paint solids. Incorporation of this small quality of fluoroacrylate copolymer not only renders the paint film more resisistant to soil accumulation, but provides a surface which is harder and has superior dirt release characteristics than similar paint films without the fluoroacrylate copolymer.

In order to evaluate the effectiveness of the fluoroacrylate compositions of the present invention in terms of providing room temperature curable, non-softenable films showing greater resistance to soiling and staining, and to demonstrate these superior properties over related film forming compositions, various tests were conducted. These tests include: room temperature curing test, thermal tack test, and a shake and rinse test.

ROOM TEMPERATURE CURING TEST

A film of test paint is cast onto glass and allowed to dry and stand for three days or longer at ambient temperature. A portion of this film is placed in trifluorotrichloroethylene, a known solvent for fluorinated polymers, and observed for signs of swelling or dissolving. The absence of swelling or dissolving indicates curing of the film.

THERMAL TACK TEST

A film of the test paint is cast onto glass and allowed to dry for three days at room temperature. The glass panel is then placed on a heated metal bar so that the film surface temperature is between 165 and 170° F. A tack tester as described in ASTM D 1640 is then placed on the film, with weights, for one minute. After one minute, the weights are removed. The film is regarded as tack-free only if the tack tester falls over immediately. The test is usually continued with increasing weights and stopped at a load of 900 grams.

SHAKE AND RINSE TEST

A painted panel (air dried for 48 to 72 hours) is placed in an oven at 160° F. for four hours. The panel is then removed from the oven and placed in a paper bag together with 50 grams of synthetic dry soil. The bag is closed and rapidly shaken for 30 seconds so that the dry soil strikes the painted surface of the panel. The panel is then removed and allowed to cool to room temperature. After cooling, the panel is rinsed under tap water and dried. The panels are rated both visually on a 10 (best) to 1 (poor) scale and with a reflectance meter using a green tristimulus filter. The change in reflectance reading before and after soiling is reported. The lower the Δ G., i.e., the difference between the reflectance readings before and after soiling, the less the dirt retention.

In the case of the thermal tack test and shake and rinse test, test films were cast onto panels using a 7 mil latex film applicator, i.e., a device designed to spread a uniform 7 mil film of paint on the test panels. The films were then air dried for 48 hours prior to testing. The synthetic dry soil, described in the article by J. M. Salsbury et al. entitled "Soil Resistant Treatment of Fabrics" in *The American Dyestuff Reporter* for March 26, 1956, for the shake and rinse tests was composed of 38 percent peat moss, 17 percent Portland Cement, 17 percent kaolin clay, 17 percent silica, 1.75 percent furnace black, 0.5 percent red iron oxide and 8.75 percent mineral oil.

The following specific examples illustrate the preparation of fluoroacrylate copolymers of the instant invention and their ability to provide room temperature curable, non-softenable films which are resistant to soiling. It is to be understood, however, that these examples are for illustrative purposes only and do not purport to be wholly definitive as to conditions and scope.

Example I

A stable copolymer latex of perfluorocyclohexylcarbinol acrylate and methylolated diacetone acrylamide was prepared by the addition of the following ingredients to a stirred, nitrogen purged pot which was maintained for two hours at a temperature of 60° C.

| Ingredients: | Amount (grams) |
|---|---|
| Water | 623.0 |
| Perfluorocyclohexylcarbinol acrylate | 165.9 |
| Methylolated diacetone acrylamide (average of 3 hydrogen methylolated) | 46.9 |
| | (55% aqueous) |
| Sodium lauryl sulfate | 35.0 |
| Dodecane thiol | 5.25 |
| Ammonium persulfate | 1.75 |
| Sodium bisulfite | 1.75 |

The resulting copolymer latex was shown to be stable for at least 6 months and was characterized as follows:

| | Percent | |
|---|---|---|
| | Found | Theory |
| Monomer to polymer conversion | 97.5 | 100.0 |
| Total solids in latex | 23.7 | 24.3 |
| Polymer solids in latex | 19.5 | 20.0 |

The fluoroacrylate copolymer of Example I was added to a semi-gloss 100% acrylic latex paint having the following constants and ingredients:

| Constants | Parts by Weight |
|---|---|
| Pigment Volume Content | 23.0 |
| Volume of Solids | 35.0 |
| Weight of Solids | 49.1 |
| pH | 9.4 to 9.7 |

| Ingredients: | |
|---|---|
| Anionic Dispersant | 15.0 |
| Wetting Agent | 1.0 |
| Antifoam Agent | 2.0 |
| Water Miscible Solvent | 120.0 |
| Water | 132.5 |
| Non-chalking rutile titanium dioxide | 275.0 |
| Acrylic Emulsion (50% solids) | 503.6 |
| Coalescent | 3.0 |
| Mercury Based Preservative | 9.0 |
| Thickener (ionic type) | 10.0 |
| Ammonium Hydroxide | 2.0 |

The fluoroacrylate copolymer of Example I was added to the above latex paint at 0.40 percent solids, based on total paint solids.

The paint composition was then brushed onto a primed yellow pine panel at a coverage rate of 450 square feet per gallon. The painted panel was dried and cured for two days at room temperature. Subsequently, the panel was placed in an oven at 170° F. for four hours. At the end of the four hour period the panel was removed from the oven and placed in a plastic bag with 100 grams of synthetic dirt and shaken vigorously for 30 seconds in such a manner that the synthetic dirt continually struck the coated surface of the panel. The panel was then removed from the bag and allowed to cool to room temperature with the synthetic dirt still in contact with the coated surface. After cooling to room temperature, the panel was rinsed with running tap water until no further synthetic soil was removed. The panel was allowed to dry and labeled Sample I.

Example III

For the purposes of comparison, a fluoroacrylate copolymer was prepared according to the method outlined in Example I, however, instead of copolymerizing the perfluorocyclohexylcarbinol acrylate with methylolated diacetone acrylamide, methylolated acrylamide was used in place thereof. This fluoroacrylate copolymer prepared with methylolated acrylamide was then incorporated into the same semi-gloss 100% acrylic latex paint used in Example II, also added at 0.40 percent solids, based upon total paint solids. The paint was then brushed onto a primed yellow pine panel at a coverage rate of 450 square feet per gallon and dried at room temperature for two days. The panel was then heated, exposed to dirt and allowed to cool in accordance with the method of Example II. The panel was rinsed with water, dried and labeled Sample II.

Samples I and II were then tested for tack and soil release properties, the latter being measured by the visual shake and rinse test and by using a reflectance meter. The results of the tests are shown in Table II.

TABLE II

| Test | Sample I | Sample II |
| --- | --- | --- |
| Thermal tack [1] | 900+ | 390 |
| Shake and rinse (visual) [2] | 8+ | 6 |
| Reflectance, ΔG value [3] | 5 | 12 |

[1] Grams required to stick tack tester to paint film having a surface temperature of 150° F.+.
[2] Dirt release rated on a graduated scale of from 10 (best) to 1 (poor).
[3] Photovolt rating with green tristimulus filter on shake and rinse panels. Lower values indicate less soil retention.

The results in Table II indicate that fluoroacrylate copolymers prepared with methylolated diacetone acrylamide (Sample I) provide non-softenable films as evidenced by the thermal tack test and have substantially better hardness properties and greater resistance to soiling in contrast to films prepared with copolymers having ordinary methylolated acrylamide (Sample II). Similar results are also obtainable with other fluoroacrylate copolymers described herein, as for example, those set forth in Table I above.

Example IV (A) To determine the cross-linking properties of methylolated diacetone acrylamide containing fluoroacrylate copolymers, the Room Temperature Curing Test described above was conducted. A copolymer prepared from perfluorocyclohexylcarbinol acrylate and methylolated diacetone acrylamide in accordance with the procedures described in Example I was drawn down on a glass with a 10 mil latex draw bar and allowed to dry at room temperature (about 25° C.). After two hours a film formed and a portion of it was placed in trifluorotrichloroethylene. This newly formed film dissolved in the solvent. The remainder of the film was allowed to stand for three days at ambient temperature. At the end of the three days, a portion of this film was then placed in the same solvent. At the expiration of 10 days there were still no signs of dissolving or swelling, indicating that methylolated diacetone acrylamide containing fluoroacrylate copolymers cure by cross-linking at room temperature.

(B) To determine the cross-linking properties of ordinary methylolated acrylamide containing copolymers, methylolated acrylamide and perfluorocyclohexylcarbinol acrylate were copolymerized according to the procedures described in Example I. The latex was drawn on a glass according to the process of Example IV. However, in this instance, the latex was allowed to air dry at room temperature for a period of five days instead of three days as in A. After having dried for the five days, the film was placed in trifluorotrichloroethylene. After only 1 day in the solvent, the film swelled, thereby indicating a low cross-linking density and the failure of methylolated acrylamide containing fluoroacrylate films to cure to an acceptable degree at room temperature.

Example V

A fluoroacrylate copolymer was prepared in a 250 milliliter 3-neck round bottom flask equipped with a mechanical stirrer, thermometer, reflux condenser and nitrogen purge means. The following ingredients were added to the round bottom flask:

| Ingredients: | Amount (grams) |
| --- | --- |
| Water | 69.5 |
| Ethylene oxide condensate of p-octylphenol dissolved in 2 grams of water | 0.5 |
| Sodium lauryl sulfate dissolved in 2 grams of water | 0.5 |
| n-Dodecyclmercaptan | 1 |
| $C_3F_7CH_2O_2CCH=CH_2$ | 17 |
| Hydroxymethy diacetone methacrylamide (average of 3 hydrogens methylolated) | 5.45 |
| | (55% active) |

The above ingredients were charged without stirring to the round bottom flask and purged with nitrogen for one hour. At that point 0.04 grams of ammonium persulfate dissolved in 2 grams of water were added to the flask with stirring and the flask was heated to 60° C. with continued stirring and maintained at that temperature for three hours under the nitrogen purge. The resulting fluoroacrylate copolymer emulsion was stable for more than three weeks, thus illustrating the desirable stabilizing effect of the anionic-non-ionic combination as a stabilizing additive.

Example VI

Following the procedure set forth in Example V a fluoroacrylate copolymer was prepared with the following ingredients:

| Ingredients: | Amount (grams) |
| --- | --- |
| Water | 48.55 |
| Sodium lauryl sulfate dissolved in 20 grams of water | 4.0 |
| n-Dodecylmercaptan | 0.6 |
| $C_3F_7CH_2OCOCH=CH_2$ | 17.0 |
| Hydroxymethyl diacetone acrylamide (average of 3 hydrogens methylolated) | 5.45 |
| | (55% active) |

As in Example V 0.20 grams of ammonium persulfate dissolved in 2 milliliters of water and sodium bisulfite dissolved in 2 milliliters of water were added to the above ingredients. The mixture was then heated to 60° C. and maintained at this temperature for three hours under a nitrogen purge. The resulting fluoroacrylate copolymer emulsion was stable for more than one week.

Example VII

A stable copolymerized latex of perfluorocyclohexylcarbinol acrylate, methylolated diacetone acrylamide and ethyl acrylate was prepared by the addition of the following ingredients to a stirred, nitrogen purged pot which was maintained for two hours at a temperature of 60° C.:

| Ingredients: | Amount (grams) |
|---|---|
| Water | 125 |
| Perfluorocyclohexylcarbinol acrylate | 45 |
| Ethylacrylate | 5 |
| Methylolated diacetone acrylamide (average of 3 hydrogens methylolated) | 9.1 (55% aqueous) |
| Ethylene oxide condensate of paraoctylphenol | 2.1 |
| Sodium lauryl sulfate | 2.1 |
| Dodecanethiol | 1.5 |
| Ammonium persulfate | 0.3 |
| Sodium bisulfite | 0.3 |

The resulting copolymer latex was found to be stable for 2 weeks and was characterized by 93 percent conversion to polymer solids in the latex at 27.9 percent. 0.3 percent solids on total solids was added to 100 percent acrylic semi-gloss latex paint and a film was cast, aged and tested as described in Example III.

|  | Ex. VII | Control |
|---|---|---|
| Shake and rinse at 170° F.: | | |
| Photometric rating | 5.0 | 3.0 |
| Thermal tack, grams | 250–300 | 250–300 |

The non-fluorinated ethylenically unsaturated monomers, which may thus be employed in an amount from about 1% to about 15% by weight of the total copolymer, include materials such as the $C_1$ to $C_{16}$ hydrocarbon acrylates, alkanol acrylates and methacrylates, vinyl acetate, styrene or the like, as well as the above-described ethyl acrylate. Their use may impart additional benefits as in the improvement of hardness, elasticity increase, or the like.

From the foregoing, it will be seen that this invention is well adapted to obtain all of the ends and objects hereinabove set forth, together with other advantages which are obvious and which are inherent to the system. When the fluoroacrylate copolymers of the present invention are incorporated into paint compositions, the desirable properties associated with aqueous systems are not only retained, but the disadvantage of soil accumulation long associated with such systems is overcome.

While the invention has been described in conjunction with specific examples thereof, this is illustrative only. Accordingly, many alternatives, modifications and variations will be apparent to those skilled in the art in light of the foregoing description, and it is therefore intended to embrace all such alternatives, modifications and variations as to fall within the spirit and broad scope of the appended claims.

What is claimed is:

1. An aqueous fluoroacrylate copolymer emulsion comprising a copolymer of;
   (A) homogeneous and heterogeneous mixtures of a methylolated amide-containing monomer having the structure:

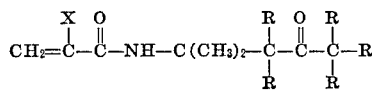

wherein X is H or $CH_3$ and R is H or $-CH_2OH$ such that at least one R and preferably an average of three R's are $-CH_2OH$ groups and the remaining R's are H; and
   (B) a fluoroacrylate monomer having the structure: $R_fCH_2OCOC(R)=CH_2$, where R is H or $CH_3$ and $R_f$ is:
       $C_nF_{2n-1}$, where $n$ is 6 to 16;
       $HC_nF_{2n}$, where $n$ is 2 to 12; and
       $C_nF_{2n+1}(CH_2)_x$, where $n$ is 3 to 12 and $x$ is 0 or 1,
wherein the ratio of fluoroacrylate monomer to amide-containing monomer is from about 60:40 to 99:1.

2. The aqueous copolymer emulsion of claim 1 wherein the methylolated amide-containing monomer is a methylolated diacetone acrylamide.

3. The aqueous copolymer emulsion of claim 2 wherein the fluoroacrylate monomer is perfluorocyclohexylcarbinol acrylate.

4. The aqueous copolymer emulsion of claim 1 wherein the methylolated amide-containing monomer is a methylolated diacetone methacrylamide.

5. The aqueous copolymer emulsion of claim 1 wherein the ratio of fluoroacrylate monomer to amide-containing monomer is from about 80:20 to about 90:10.

6. The aqueous copolymer emulsion of claim 1 wherein the copolymer includes a non-fluorinated ethylenically unsaturated monomer in an amount from about 1% to about 15% of the copolymer.

7. An aqueous latex paint emulsion comprising a pigmentary material, an aqueous dispersion vehicle therefor and from 0.05 to 0.7 percent solids, based on total paint solids, of a fluoroacrylate copolymer of;

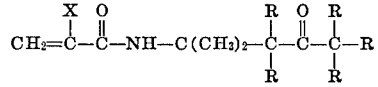

8. The paint composition of claim 7 wherein the methylolated amide-containing monomer of the fluoroacrylate copolymer is a methylolated diacetone acrylamide.

9. The paint composition of claim 8 wherein the fluoroacrylate monomer is perfluorocyclohexylcarbinol acrylate.

10. The paint composition of claim 7 wherein the methylolated amide-containing monomer of the fluoroacrylate copolymer is a methylolated diacetone methacrylamide.

11. The paint composition of claim 7 wherein the fluoroacrylate copolymer inculdes a copolymerized non-fluorinated ethylenically unsaturated monomer in an amount from about 1% to about 15% of the copolymer.

12. A method of reducing soil accumulation on the surface of paint film which comprises applying to a substrate an aqueous latex paint emulsion comprising a pigmentary material, an aqueous dispersion vehicle therefor and from 0.05 to 0.7 percent solids, based on total paint solids, of a fluoroacrylate copolymer of;
   (A) homogeneous and heterogeneous mixtures of a methylolated amide-containing monomer having the structure:

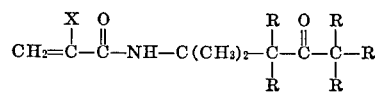

wherein X is H or $CH_3$ and R is H or $-CH_2OH$ such that at least one R and preferably an average of three R's are $-CH_2OH$ groups and the remaining R's are H; and
   (B) a fluoroacrylate monomer having the structure: $R_fCH_2OCOC(R)=CH_2$, where R is H or $CH_3$ and $R_f$ is:
       $C_nF_{2n-1}$, where $n$ is 6 to 16;
       $HC_nF_{2n}$, where $n$ is 2 to 12; and
       $C_nF_{2n+1}(CH_2)_x$, where $n$ is 3 to 12 and $x$ is 0 or 1,
wherein the ratio of fluoroacrylate monomer to amide-containing monomer is from about 60:40 to about 99:1.

13. The method of claim 12 wherein the methylolated amide-containing monomer of the fluoroacrylate copolymer is a methylolated diacetone acrylamide.

14. The method of claim 13 wherein the fluoroacrylate monomer is perfluorocyclohexylcarbinol acrylate.

15. The method of claim 12 wherein the methylolated amide-containing monomer of the fluoroacrylate copolymer is a methylolated diacetone methacrylamide.

16. The method of claim 12 wherein the fluoroacrylate copolymer includes a copolymerized non-fluorinated ethylenically unsaturated monomer in an amount from about 1% to about 15% of the copolymer.

References Cited
UNITED STATES PATENTS

| | | | |
|---|---|---|---|
| 2,472,812 | 6/1949 | Dickey | 260—486 R |
| 2,642,416 | 6/1953 | Ahlbrecht et al. | 260—83.5 R |
| 3,277,056 | 10/1966 | Coleman | 260—63 R |
| 3,356,628 | 12/1967 | Smith et al. | 260—29.6 F |
| 3,378,609 | 4/1968 | Fasick et al. | 260—29.6 FX |
| 3,455,889 | 7/1969 | Coleman | 260—80.72 |
| 3,497,467 | 2/1970 | Coleman | 260—29.6 T |
| 3,518,326 | 6/1970 | Forsberg | 260—828 |
| 3,532,659 | 10/1970 | Hager et al. | 260—63 HA |
| 3,663,490 | 5/1972 | Sarem | 260—29.6 TA |
| 3,701,754 | 10/1972 | Farone | 260—72 RX |
| 3,378,609 | 4/1968 | Fasick et al. | 260—29.6 F |
| 3,356,628 | 12/1967 | Smith et al. | 260—29.6 F |
| 3,277,056 | 10/1966 | Coleman | 260—63 |
| 3,701,754 | 10/1972 | Farone | 260—64 |
| 3,518,326 | 6/1970 | Forsberg | 260—828 |
| 3,459,696 | 8/1969 | Read | 260—853 |
| 3,753,958 | 8/1973 | Wingler et al. | 260—63 R |
| 3,735,003 | 5/1973 | Zimmer | 260—80.3 N |
| 3,798,171 | 3/1974 | Ishii et al. | 260—80.3 N |
| 3,533,977 | 10/1970 | Read | 260—853 |

JOSEPH L. SCHOFER, Primary Examiner

T. S. GRON, Assistant Examiner

U.S. Cl. X.R.

260—29.4 R, 29.6 TA, 63 HA, 89.5 H, 853, 900

UNITED STATES PATENT AND TRADEMARK OFFICE
CERTIFICATE OF CORRECTION

PATENT NO. : 3,844,999

DATED : October 29, 1974

INVENTOR(S) : Robert G. Petrella

It is certified that error appears in the above-identified patent and that said Letters Patent are hereby corrected as shown below:

Column 1, line 41, delete "pervent" and substitute therefor --prevent--

Column 1, line 44, delete "solid" and substitute therefor --soil--

Column 2, line 7, delete "methacrylamine" and substitute therefor --methacrylamide--

Column 2, line 24, delete "oroarylate" and substitute therefor --oroacrylate--

Column 2, line 72, delete "sail" and substitute therefor --soil--

Column 5, line 33, delete "quality" and substitute therefor --quantity--

Column 5, line 49, delete "theree" and substitute therefor --three--

Column 6, line 54, insert --EXAMPLE II--

Column 10, lines 20- , Claim 7, before the Formula, insert the following:

--(A) Homogeneous and heterogeneous mixtures of a methylolated amide-containing monomer having the structure--

UNITED STATES PATENT AND TRADEMARK OFFICE
CERTIFICATE OF CORRECTION

PATENT NO. : 3,844,999
DATED : October 29, 1974
INVENTOR(S) : Robert G. Petrella It is certified that error appears in the above-identified patent and that said Letters Patent are hereby corrected as shown below:

Column 10, line 24, after the formula, insert the following:

--wherein X is H or $CH_3$ and R is H or $-CH_2OH$ such that at least one R and preferrably an average of three R's are $-CH_2OH$ groups and the remaining R's are H; and (B) A fluoroacrylate monomer having the structure:

$R_fCH_2OCOC(R)=CH_2$, where R is H or $CH_3$ and $R_f$ is:

$C_nF_{2n-1}$, where n is 6 to 16;

$HC_nF_{2n}$, where n is 2 to 12; and $C_nF_{2n+1}(CH_2)_x$, where n is 3 to 12 and X is 0 or 1, wherein the ratio of fluoroacrylate monomer to amide-containing monomer is from about 60:40 to 99:1.--

Signed and Sealed this

Third Day of August 1976

[SEAL]

Attest:

RUTH C. MASON
*Attesting Officer*

C. MARSHALL DANN
*Commissioner of Patents and Trademarks*